United States Patent [19]

Saund et al.

[11] Patent Number: 5,553,224
[45] Date of Patent: Sep. 3, 1996

[54] METHOD FOR DYNAMICALLY MAINTAINING MULTIPLE STRUCTURAL INTERPRETATIONS IN GRAPHICS SYSTEM

[75] Inventors: Eric Saund, San Carlos; Thomas P. Moran; Craig D. Becker, both of Palo Alto, all of Calif.

[73] Assignee: Xerox Corporation, Stamford, Conn.

[21] Appl. No.: 101,646

[22] Filed: Aug. 4, 1993

[51] Int. Cl.⁶ ............................................. G06F 3/14
[52] U.S. Cl. ........................ 395/155; 395/161; 395/133
[58] Field of Search ................................. 395/155, 161, 395/159, 156, 133, 134, 141, 142, 143; 382/9, 22, 25

[56] References Cited

U.S. PATENT DOCUMENTS

| | | | |
|---|---|---|---|
| 4,683,468 | 7/1987 | Himelstein et al. | 345/163 |
| 4,703,321 | 10/1987 | Barker et al. | 345/121 |
| 5,018,216 | 5/1991 | Kojima | 382/22 |

OTHER PUBLICATIONS

Plomp, "An Object–Oriented Representational Systems for Image Features and Their Relations", Pattern Recognition, 1992 11th International, vol. I: Conference A, pp. 518–521.

"Perceptual Grouping Based on Fuzzy Sets", Fuzzy Systems, International Conference 1992, Kang et al., pp. 652–659.

"Labeling of Curvilinear Structure Across Scales by Token Grouping", Computer Vision and Pattern Recognition, 1992 pp. 257–263.

"Engineering Drawing Recognition Based on a Line Decomposition and Re–Composition Method", Systems Engineering, 1992 IEEE International Conference, pp. 225–228.

"Symbolic Construction of a 2–D Scale–Space Image", IEEE Transactions On Pattern Anaysis And Machine Intelligence, Eric Saund, Aug. 1990, vol. 12, No. 8, pp. 817–830.

"Issues In Combining Marking And Direct Manipulation Techniques", Gordon Kurtenbach and William Buxton, Nov. 11–13, UIST 1991, pp. 137–144.

*Primary Examiner*—Raymond J. Bayerl
*Assistant Examiner*—Crescelle N. dela Torre
*Attorney, Agent, or Firm*—Rosen, Dainow & Jacobs Limited Liability Partnership

[57] ABSTRACT

A graphical input and display system for creating and manipulating an abstract graphical image by decomposing it into abstract elemental objects and organizing the elemental objects into a set of perceptually coherent composite objects. The system includes an input device for entering the graphical image, such as a mouse or digitizer and electronic stylus, a display, and a function selection system for manipulating the graphical image. The system decomposes the graphical image entered onto the display into abstract elemental objects each consisting of one or more consecutive "on" pixels within the image. The system organizes the elemental objects into composite objects, which are abstract groups of elemental objects, such that each elemental object belongs to one or more composite objects and each composite object contains one or more elemental objects. The elemental and composite objects are linked in a lattice data structure stored in system memory. When a user manipulates the graphical image, the system creates new elemental objects in the manipulated region of the image, reorganizes all or part of the composite objects into one or more new composite objects, and updates the lattice data structure.

18 Claims, 16 Drawing Sheets

DISPLAYED IMAGE    USER-ACCESSIBLE OBJECTS

DISPLAYED IMAGE    USER-ACCESSIBLE OBJECTS

DISPLAYED IMAGE  USER-ACCESSIBLE OBJECTS

DISPLAYED IMAGE  USER-ACCESSIBLE OBJECTS

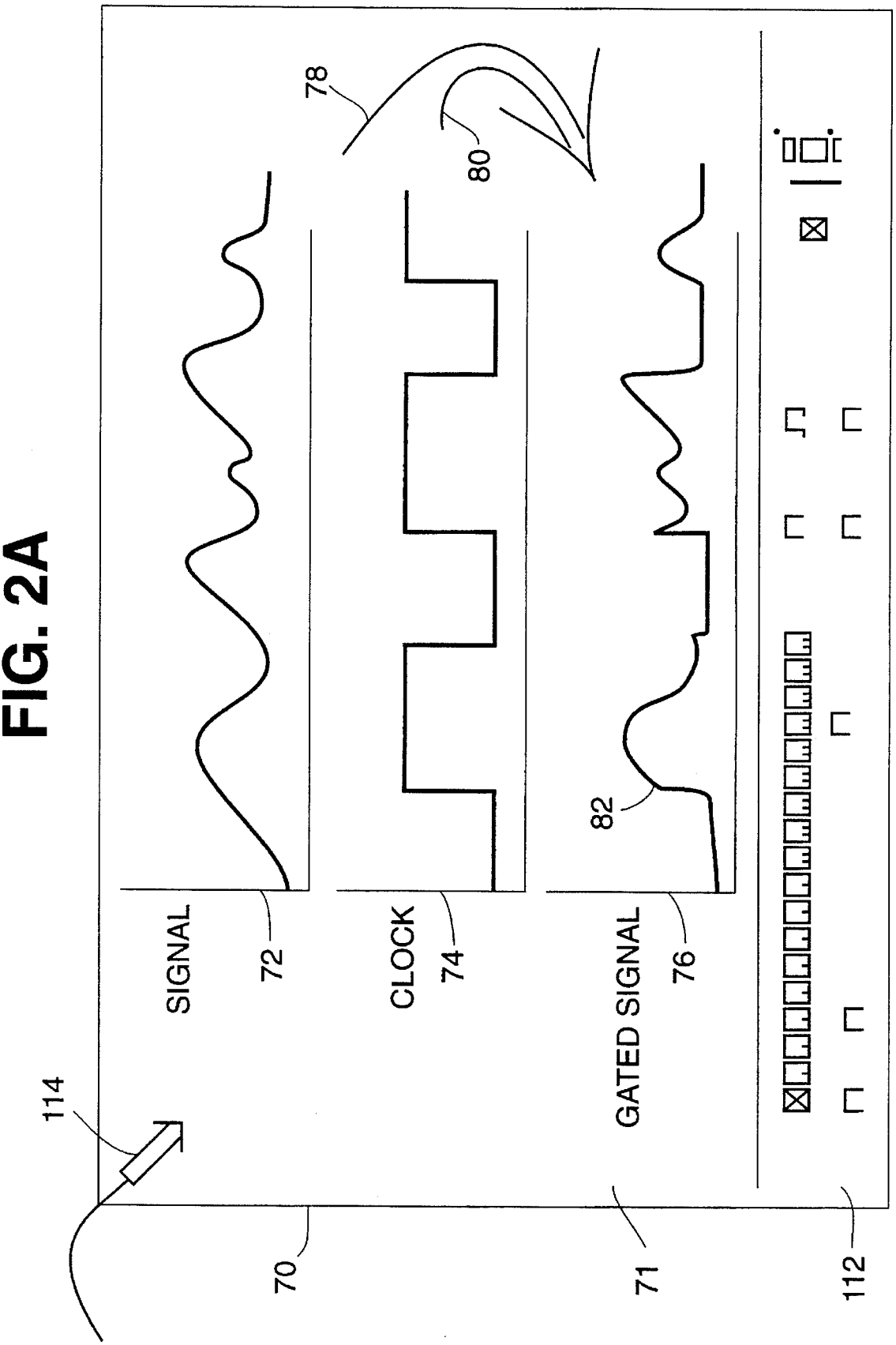

FIG. 6A
DISPLAYED IMAGE
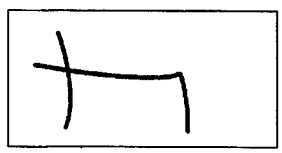
FIG. 6B
PRIME-OBJECTS
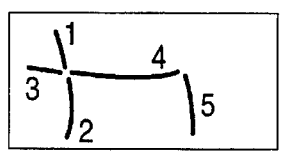
FIG. 6C
COMPOSITE-OBJECTS
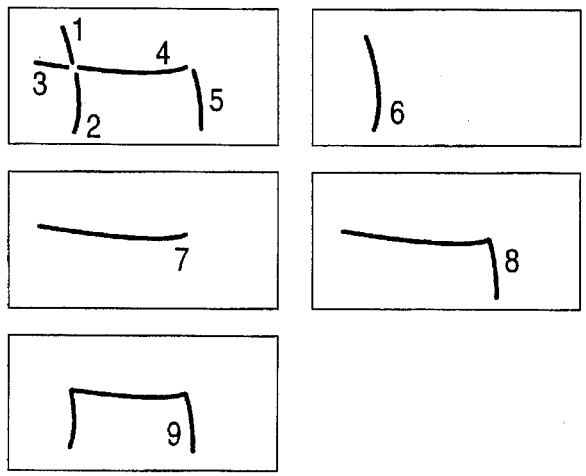
OBJECT-LATTICE
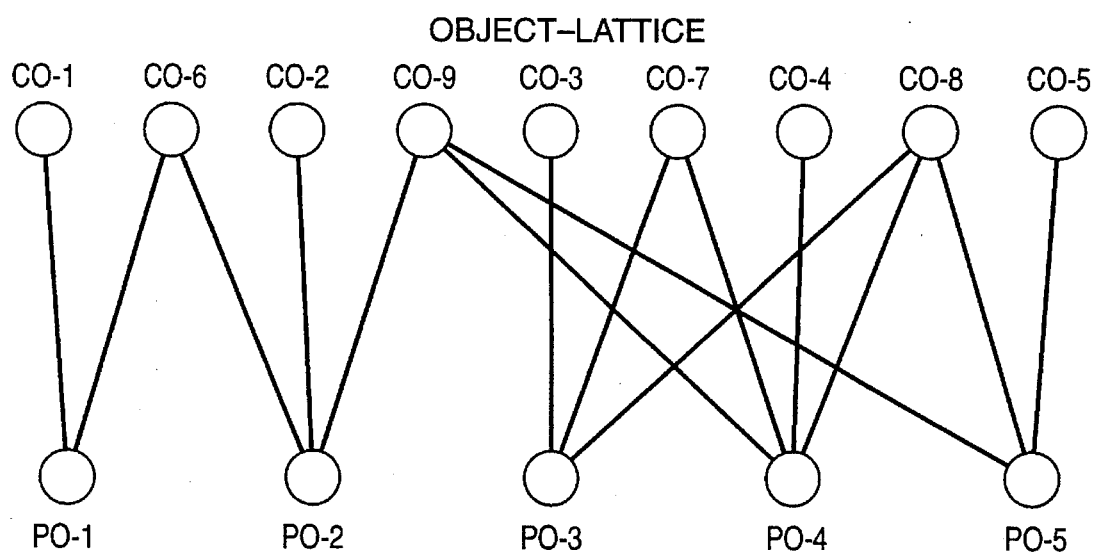
FIG. 6D

METHOD FOR DYNAMICALLY MAINTAINING MULTIPLE STRUCTURAL INTERPRETATIONS IN GRAPHICS SYSTEM

RELATED APPLICATIONS

This application is related to Ser. No. 869,554, filed Apr. 15, 1992, Ser. No. 869,559, filed Apr. 15, 1992, and attorney docket XRX-137, Ser. No. 101,645, filed on even date with this application, all assigned to the present assignee, the disclosures of which are in their entirety, each specifically incorporated by reference herein.

FIELD OF THE INVENTION

This invention pertains generally to computer graphics, and particularly to a system and method enabling users to create and edit graphical images using a mouse, stylus, the hand of the operator or other form of pointing device.

BACKGROUND OF THE INVENTION

Typically, computer graphics operations with a pointing device are of two types; drawing operations and control operations. Drawing operations describe loci for the placement of visible marks on the image, analogous to drawing on a piece of paper by making a motion with a pen in contact with the surface. Control operations are used to initiate and guide the execution of computer functions leading to modification of the visible marks. Control operations are especially important to the performance of editing functions such as erasing, moving, or changing the visual qualities (e.g. line width) of visible marks in the image.

Underlying such an interactive computer-assisted graphical editing tool is means for maintaining information about the graphic elements of the image that may be selected and modified under user control. The various extant computer-assisted drawing tools may be classified along a spectrum defined by the granularity of the manipulable graphical elements. On the one hand, so-called paint programs manipulate the visual content of images at the level of individual pixels, each of whose lightness and/or color properties is modifiable independently from the other pixels. While paint style programs permit detailed refinement of an image, their inability to define and geometrically transform whole groups of pixels makes many operations extremely tedious to perform. On the other hand, structured-graphics editing programs operate at the level of larger abstract objects such as lines, circles, and polygons whose rendition on the imaging surface includes many pixels, all of which are modified in unison when objects are moved, deleted, or otherwise modified. The rationale for structured-graphics editing programs lies in an assumption that the sorts of image modifications that users will usually want to perform will be ones that preserve the geometric structures reflected in the abstract level objects.

The present invention offers a new point in the spectrum of computer assisted drawing tools, one that incorporates advantages from both the paint and structured-graphics extremes of graphical image editors.

SUMMARY OF THE INVENTION

The object of this invention is to enable manipulation graphical elements at a level more abstract than individual pixel elements, but more flexibly than permitted by existing structured graphics editors.

The foregoing object is achieved in accordance with the invention by virtue of a graphical editing tool for maintaining a rich and overlapping set of abstract objects which the user may access individually or in groups, and moreover, to dynamically update and reconfigure this set of abstract objects as the user makes modifications to a drawing. These background functions are performed by the editing tool automatically and without the user's knowledge or attention; covertly, they maintain a constant, fresh, resource of abstract objects which the user may access quickly and conveniently to manipulate the visible marks in the image in perceptually natural "chunks." In contrast to that of structured-graphics style editors, the rationale behind the present invention is that the larger, abstract image structures that users will most often want to manipulate will be those that result from human perceptual processes that tend to organize local, pixel level, light and dark patterns into small, intermediate, and large scale perceptual chunks resembling lines, curves, regions, and other "Gestalt" entities. It will be understood that graphical objects as employed herein is intended to refer to alpha numeric text as well as the forgoing entities. The manipulable objects maintained by this invention reflect the flexible and sometimes ambiguous nature of human perceptual processes by permitting multiple and overlapping abstract object level interpretations of the visible image elements. These natural units of image organization and manipulation are emergent from the spatial relationships among sets of marks present in the image and cannot be derived solely from the properties attributed to graphical objects at the time of their creation. Consequently, the core technologies contributing to this invention derive not only from the tradition of computer graphics, but crucially from computer vision and image analysis.

More specifically, the object of the invention provides an an object oriented graphic input and display system for graphical abstract objects, responsive to user selected manipulation functions, comprising a data structure including input means, display means and function selection means, said input means being user manipulable for entering graphical objects onto said display and for selecting functions on said function selection means for manipulating said graphical objects, a lattice data structure responsive to data signals from said data structure representing objects entered on said display for decomposing said abstract objects into elemental objects, means for organizing elemental objects into groups of elemental objects, and means for re-organizing said groups of elemental objects into a further group of elemental objects, said graphical data structure and function selection means coordinating said reorganization in accordance with user selection of functions to be performed on all or on portions of said objects.

BRIEF DESCRIPTION OF THE FIGURES

FIGS. 2a and 2b show an electronic display of manipulated images;

FIG. 6a–d diagrammatically showing the relationship between image objects and sub objects;

DESCRIPTION OF THE PREFERRED EMBODIMENTS

Figure 1A:
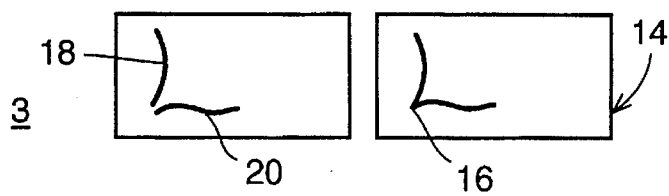
FIGS. 1a–d illustrates an object analysis of a displayed image.

FIGS. 1a–d each illustrate the functionality made possible by this invention. A prototypical drawing creation and editing session with a graphical editing application tool embodying this invention preferably proceeds as follows:

Referring to FIG. 1a, using a pointing device in DRAW mode, the user draws an "L"-shaped curve 10 which appears on an imaging surface 12. Running in the background, the computer program creates an abstract object 14 corresponding to the "L"-shaped curve. It also detects the presence of a salient sharp corner 16 in this curve; consequently, it creates abstract objects 18 and 20 corresponding to the vertical and horizontal segments of this curve. At any time the user may press a button on the pointing device or type keystrokes to toggle into a COMMAND mode. A gesture made on the imaging surface in COMMAND mode serves to identify one or more of the abstract objects that the program has created. Copending patent application attorney docket XRX-137, serial no. 101,645, filed on even date herewith and assigned to the assignee of the present invention describes object selection using simple and natural gestures of a pointing device. The user may now issue further instructions using the pointing device and/or the keyboard in order to delete, move, copy-move, rotate, change thickness, scale in size, or otherwise modify the object(s) selected.

Figure 1B:
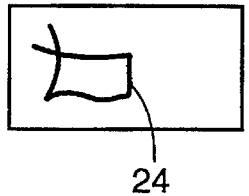
Figure 1B:
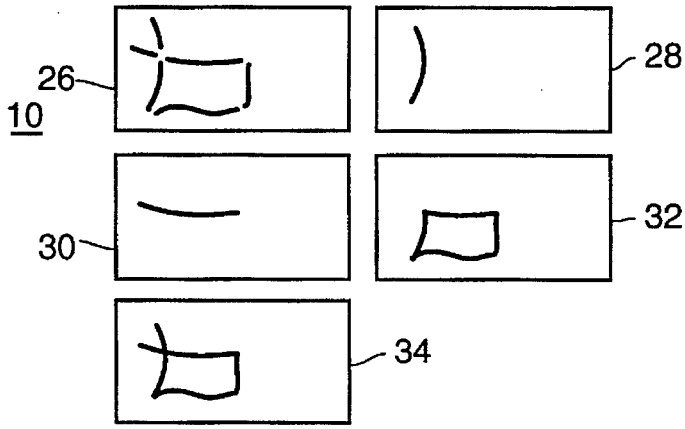

Referring to FIG. 1b, using the pointing device in DRAW mode, the user elects to draw an inverted "L" 24. The program detects the corner in this stroke, as well as additional significant spatial structures emergent from the proximity of this stroke and the previous one. These structures include the corner formed at the bottom right of the figure, and the crossing junction at the upper left. The program creates abstract objects corresponding to (i) each of individual short relatively straight segments 26; (ii) curve segments bounded by crossing or T-junctions 28; (iii) curve segments bounded by corners 30; (iv) curve segments that continue through junctions and corners 32; (v) curve segments created by tracing certain salient convex paths 34.

Figure 1C:
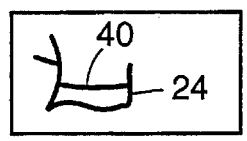
Figure 1C:
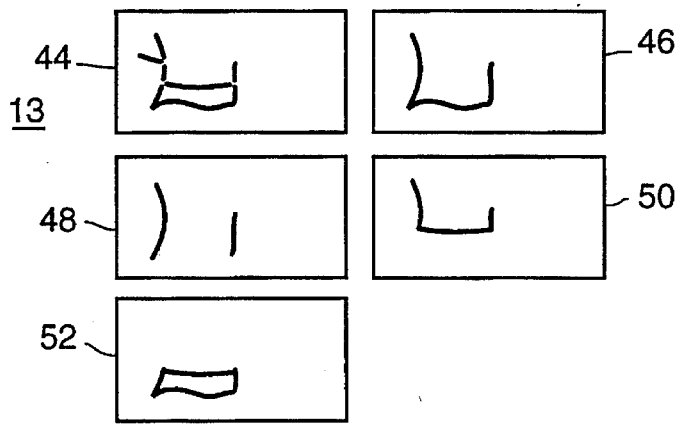

As shown in FIG. 1c, using the pointing device in COMMAND mode, the user selects the short line segment 40 corresponding to the top of the rectangle 42, and executes a "move" operation to translate the segment to a position midway down the sides of the rectangle. The program notices that certain abstract level graphical objects, dependent upon the previous position of this segment in relation to other segments, are now rendered obsolete by the move operation, and these objects are removed from the set of selectable objects. The program also notices new salient spatial events, in particular the new T-junctions created by the new placement of the segment. Appropriate new abstract level objects are created, including new short segments 44, 46, 48, 50 and a new convex path object reflecting the identifiable rectangle 52.

Figure 1D:
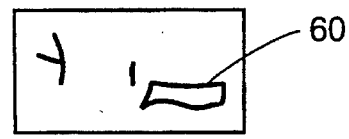
Figure 1D:

As shown in FIG. 1d, using the pointing device in COMMAND mode, the user selects the rectangle 60 and moves it away. The program notices the several abstract level objects that are made obsolete by this change in the image, leaving objects 62 and 64, and it removes them from the set of objects available for manipulation by the user. No new abstract objects are created by this particular user action.

This brief user-interactive session illustrates that the present invention permits users to select and manipulate objects according to a multiplicity of ways in which they may interpret, perceptually, the elemental pixel values present on the imaging device. Further, it illustrates the importance of dynamically updating the set of manipulable objects as emergent spatial properties are created and obliterated. To duplicate the same sequence of visible changes to the image as performed in the above session using a paint style or a structured graphics style image editing tool would require a much greater number of significantly more difficult and more cumbersome user actions.

Figure 2B:
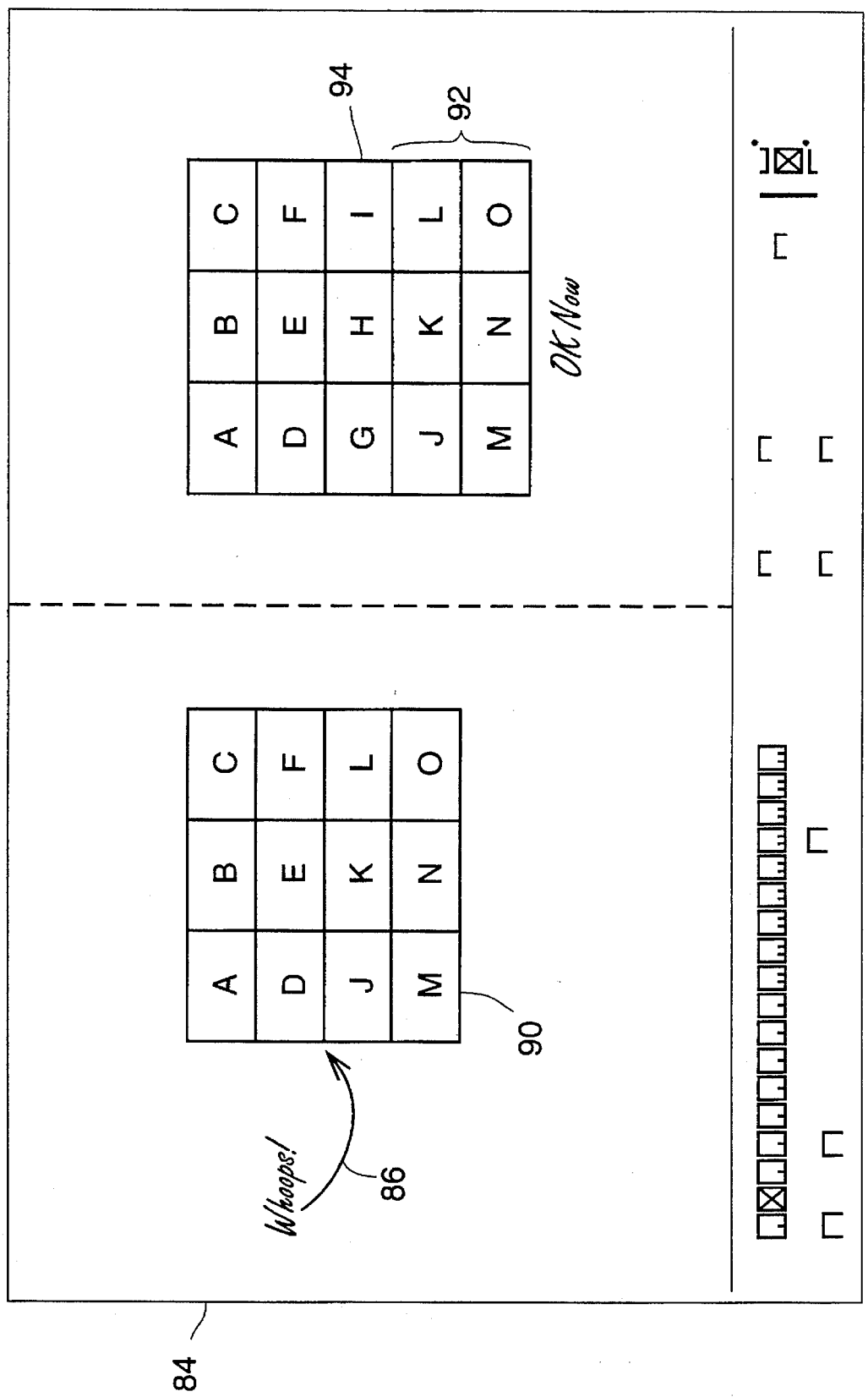

FIGS. 2a and 2b presents two scenarios under which this invention adds power to a freehand line drawing editor or any geometric editor. In FIG. 2a, an electrical engineer at a graphic input station accurately constructs the result when an analog input signal is gated by a clock signal. In FIG. 2b, the missing row in a table is filled by moving aside-but not erasing and rewriting-the portions of the table already completed. More specifically, in FIG. 2a, an electrical engineer at an electronic data entry and display device 70 such as a digitizing display sketchpad or "whiteboard" has drawn an analog input signal 72 and a clock signal 74, and wishes to see what the analog signal looks like 76 when it is gated by the clock signal. He accomplishes this by executing the following steps: (1) Perform a "copymove" 78 of the drawing of the analog signal to the result location. (2) Perform a "copy-move" 80 of the clock signal to the result location, overlapping the analog signal. (3) Select and delete extraneous segments, leaving behind the result 82 shown. In FIG. 2b, another example of the object selection system is shown, wherein at a group brainstorming session, a meeting facilitator constructs a table of entries at an electronic data entry device 84. The group decides that another row belongs at area 86 in the middle of the table 90. Instead of having to erase and redraw part of the table in order to make room for the new row, the facilitator can select and move the appropriate portion 92 of the table 90 down, and draw in only the new entries 94.

The graphical input and display component 70 is an electronic input device such as an electronic sketchpad, or "live board" or "white board" which employs a working surface and a plurality of accessible functions, such as is generally illustrated in FIGS. 2a and 2b. The working surface area 71 is the upper area of the component 70 and the function access positioned along the bottom area 112. Typical functions are delete, move, shrink, enlarge, and so on. These functions are optional in designation, their principal objects being to define operations which are inherent in the operation of the invention. A suitable user manipulable control such as a stylus or light pen or the like 114 is employed to both draw input symbols and select functions. Obviously, other variants within the skill of the art may be employed. For example, proximity sensors can be used near the display board, and can sense hand or other types of pointer movements to enter. Also, data input may be by means of a scanning device for inputting graphical data from hard copy. An example of "live board" construction is found in copending applications Ser. No. 869,554, filed Apr. 15, 1992, and Ser. No. 869,559, filed Apr. 15, 1992, and assigned to the assignee of the present invention, the disclosures of which are incorporated by reference. In these devices, the entire upper surface area 110 is an interactive display, that is, the image is generated from within in response to inputted data such as from the user manipulated control. Re-imaging results from user manipulation of defined objects and is displayed on the same surface, as indicated by the examples shown in FIGS. 2a and 2b.

Figure 3A:
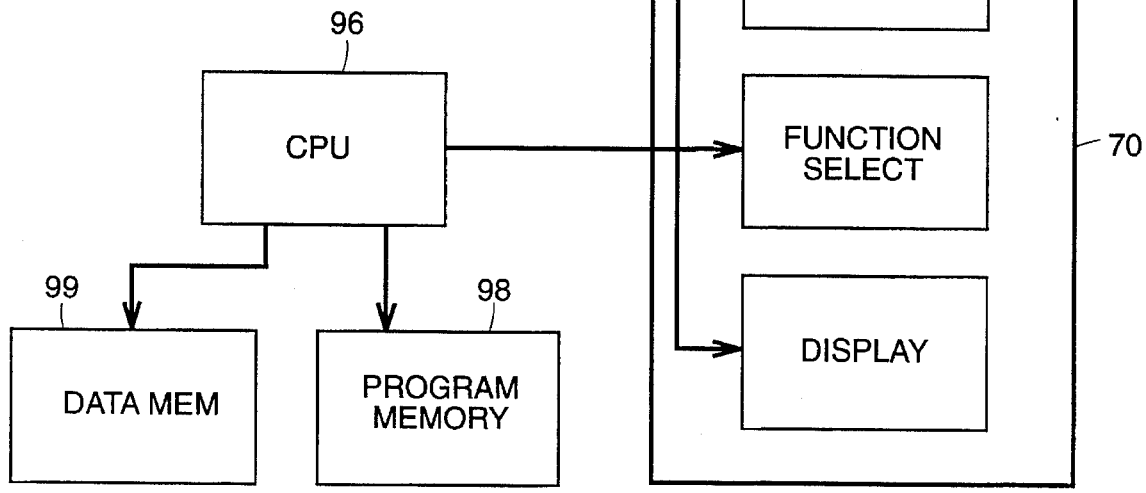
FIG. 3a is a routine diagram illustrating the system operation of the invention.

Referring to FIG. 3a, a system for implementing the invention is shown wherein a graphical input and display component 70, including input, function select and display areas as described in conjunction with FIG. 2a, is coupled to a microprocessor CPU 96. The CPU 96 receives and processes signals from the component 70 in accordance with instructions received from the program memory 98. Data is organized in accordance with program operations and stored in data memory 99.

Figure 3B:
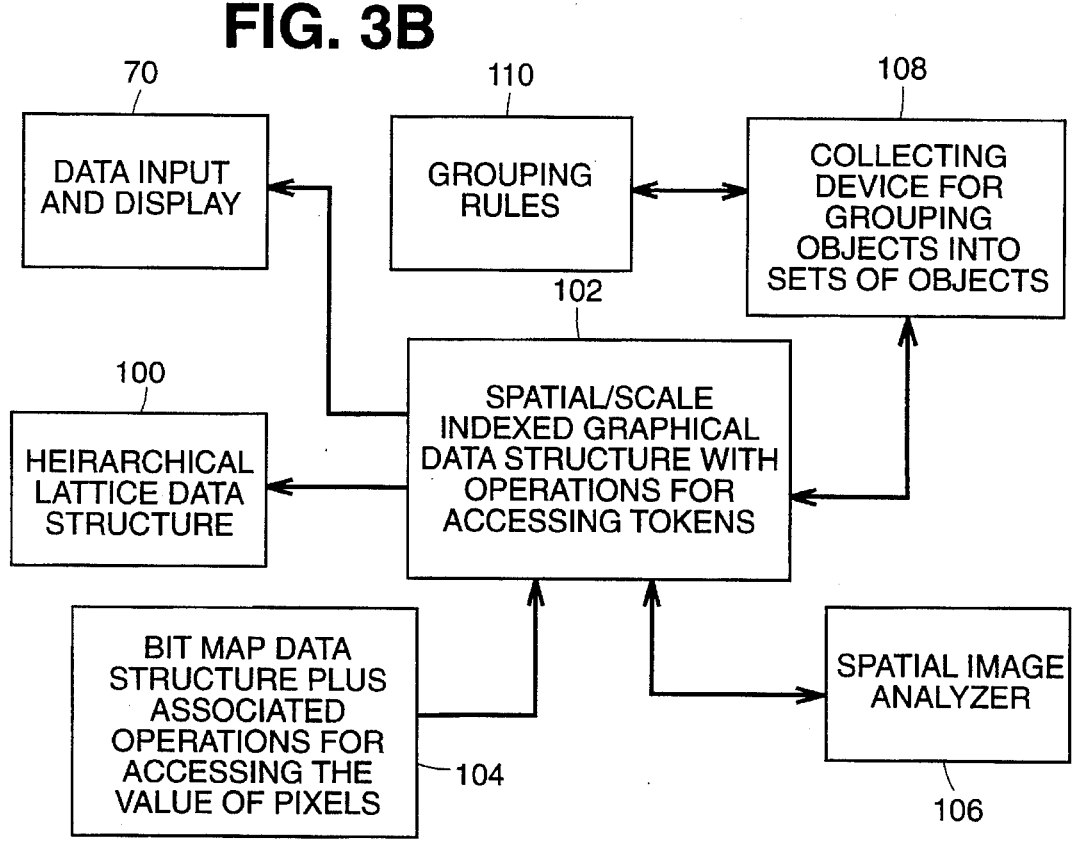
FIG. 3b is an organizational diagram of the principal sequence of operation for grouping objects.

The present invention provides a novel and unique method and apparatus for configuration of data structures and operations permitting an open-ended set of functionally specified perceptual grouping rules to be applied dynamically by the CPU 96 as a graphical image data is input and edited. Referring to FIG. 3b, constituent operational components required to be applied to input and edit data are: (1) a hierarchical lattice data structure 100 plus associated operations for accessing primary and secondary objects or sets of objects; (2) a spatially and scale indexed blackboard data structure 102 plus associated operations for accessing tokens; (3) a bitmap data structure 104 plus associated operations for accessing the values of pixels therein; (4) a spatial image analyzer 106; and (5) a collecting device 108 for grouping objects into sets of object. The input display component 70 provides data to the CPU 96 which in turn operates to coordinate and implement the grouping rules to be applied in the data structures 100, 102, 104, 106 and 108, as well as in any additional data structures 110.

These components are organized under a class of control architectures which apply basic operations at appropriate times to maintain a correct, consistent and perceptually significant set of abstract objects for the user's access. Section 1 below discusses the issue of control architecture; Sections 2.1 through 2.5 describe the enabling component data structures and their functions; finally Sections 2.6 and 2.7 detail how the components are employed to support the crucial control-level basic operations.

For the purposes of the present invention, the invention is described in the context of a freehand line drawing editor. However, the principles and techniques of this invention apply equally well to in other graphic environments, such as a structured graphics style image editors in which the user initiates the drawing of an object by selecting from a predetermined class of structured object types (e.g. circles, rectangles, polygons), to paint style image editors in which the user manipulates spatially extended (in two dimensions) regions of an image an opposed to objects consisting of one-dimensional plane curves, and to text editors where text is entered with a keyboard and selected and arranged with appropriate gestures.

1. Control Architecture and Basic Operations

Figure 4:
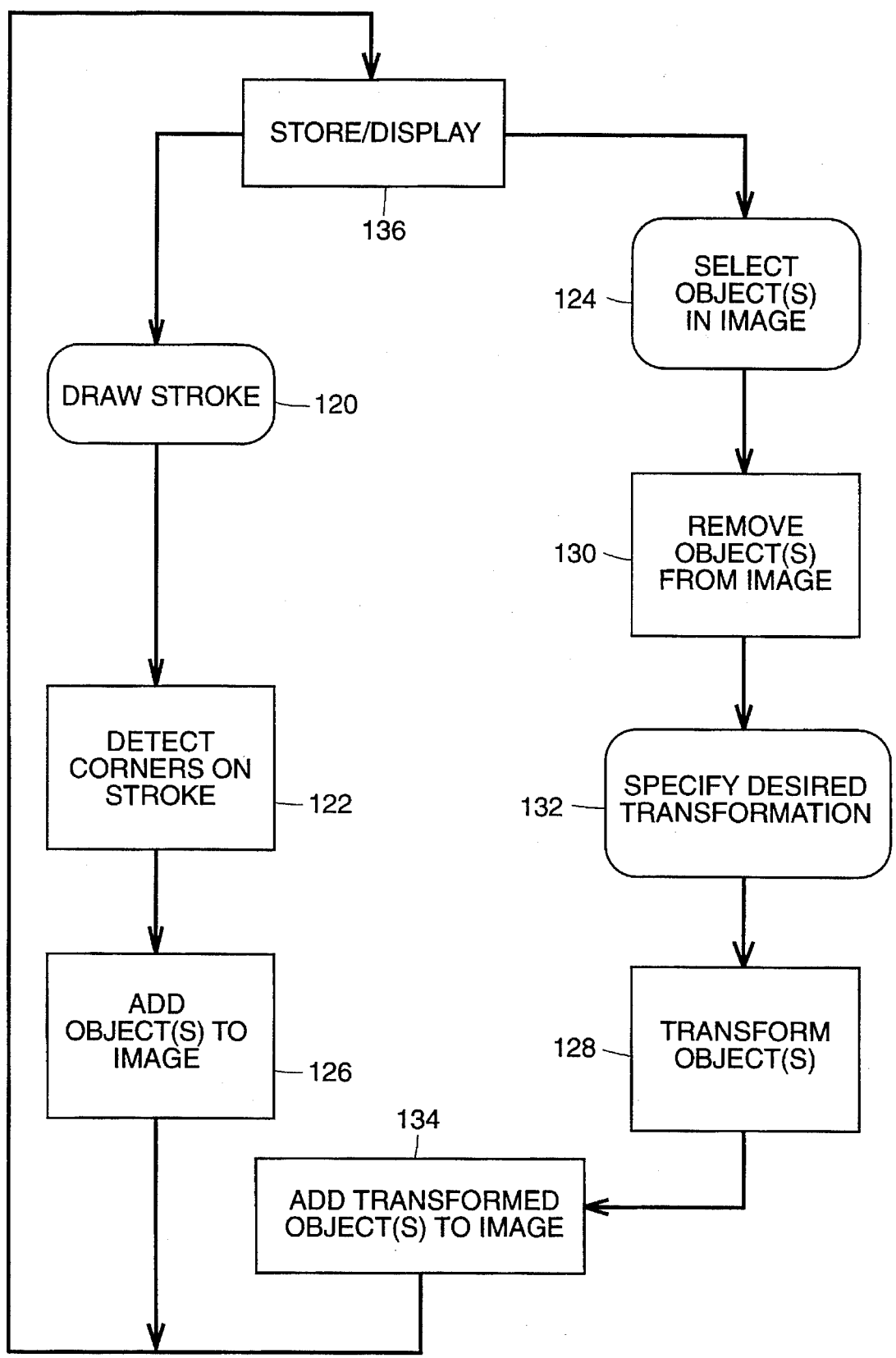
FIG. 4 is a flow chart showing the sequence of operations for object manipulation.

A line drawing editor application may incorporate the present invention by making use of the following basic operations illustrated in FIG. 4 wherein is shown a prototypical control structure for a computer-assisted graphical editing tool incorporating the invention. User actions are shown as encircled by rounded bases, and computer implemented functions are shown in rectangular basis. The basic sequence of operational functions are:

1. Draw Stroke or Curve, 120
 2. Detect Corners on a Stroke or Curve, 122
 3. Select Object(s), 124
 4. Add Object(s) to Image, 126
 5. Remove Object (s) from Image, 130
 6. Specify Desired Transformation, 132
 7. Transform Object(s), 128
 8. Add transformed object to Image, 134
 9. Store and/or Display, 136

These operations may be applied under any of a class of control architectures governing the dynamics of the user/machine interaction/interpretation cycle.

In this structure, the user participates in a cycle in which either new curves are repeatedly drawn into the image, or else existing curves are selected and modified and then added to the image. The rectangular boxes in this diagram identify basic operations necessary to maintain correct and consistent information as to the appearance and organization of the marks in the image, as well as the abstract level constructs available for the user to manipulate graphic objects in terms of perceptually natural units. Under the above control structure, user DRAW mode or COMMAND mode instructions alternate with system drawing modification and structure interpretation operations.

Figure 5:
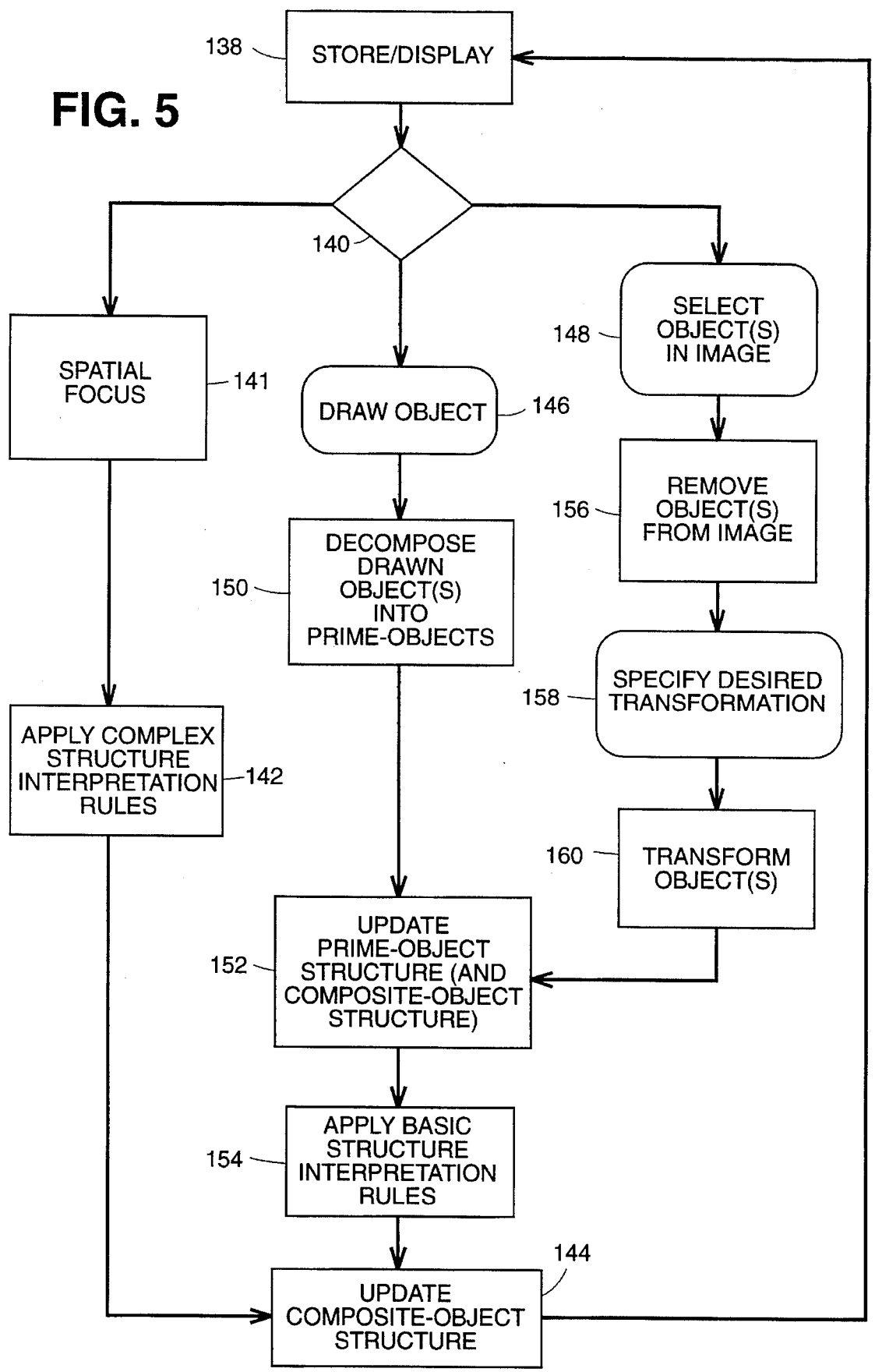
FIG. 5 is a flow chart illustrating object transformation and updating.

More complex control structures are also supported by this invention, such as the one shown in FIG. 5, which shows an advanced control structure for a computer-assisted graphical editing tool incorporating this invention. The structure shown in FIG. 5 has rounded boxes as user defined operations and rectangular boxes as computer-implemented functions. This control structure permits the tractable application of very large structure interpretation rule sets by two means. First, only a reduced set of "core" structure interpretation rules are automatically applied after each user gesture or instruction, and the remaining, more advanced rules, intended to identify more complex structure, operate in the background on a "cycles-available" basis. Abstract objects explicitly representing this structure are added to the hierarchial lattice data structure 100 (FIG. 3b) and graphical data structures as it is discovered. Second, the advanced rules are applied in a spatially focused manner so that complex structure will be sought at image regions most likely to be of interest to the user. The loci of user interest are determined on a heuristic basis, that is, locations where the user has most recently performed draw or move commands, regions where the user has recently directed a pointing device, or regions where a set of proximity sensors near the physical imaging surface has determined that the user has gestured toward with his hand. Referring to FIG. 5, data entered in display component 138 is presented as an inputted object to function block 146. Upon completion of drawing of an object, sensed by a period of inactive indecision block 140, the region of interest is inferred, routine 141, by the computer based on the area thus defined heuristically by the user. This is effected through a basic routine which simply stores the location of inputted data on a time line basis, with the last data in being the first data out. The computer then applies complex structure interpretation rules, routine 142, to the objects retrieved in the inferred spatially focussed area. The resulting defined objects are stored for display, routine 144. The user then interacts with the defined objects by drawing objects, routine 146, or removing objects, beginning with object selection, routine 148. The drawn objects are then broken down or decomposed into Prime Objects, hereinafter defined, routine 150. These decomposed or Prime Objects are then employed to update the Prime Object structure, as well as the Components Object structure, routine 152. Basic structural interpretation rules are then applied to the updated Prime Object structure, routine 154, to update the Composite Object structure 144. When removing objects, the user first selects an object in the image, routine 148. The computer then acts to remove the object, routine 156. The desired transformation, such as movement, deletion, shape change or the like is then selected, routine 158. The computer then carries out the desired transformation, routine 160, and accordingly updates the Prime-Object structure, routine 152, and applies the basic structure interpretation rules, 154.

The operations Remove Object(s) from Image routine 130, routine 156 and Add Object(s) to Image routine 126 are described below in further detail. The Draw Object routine 146 implemented by tracking the position of the pointing device. Many methods for performing the operation Detect Corners, routine 122, can be found in the computer vision literature. The operation, Select Object(s) routine 160 is described in more detail in copending application Ser. No. 101,645 filed on even date herewith, the disclosure of which is incorporated by reference. Finally, the Transform Object(s) routine 160 is implemented by a simple affine or other transformation to a curve.

2. Data Structures and Basic Operations

2.1 Object Lattice

Referring to FIG. 3b and in conjunction with the chart of FIG. 6a–d, the Object Lattice data structure 100 maintains the relationship between elemental objects at the level of pixels in the image, and image objects that may be selected and operated on by the user. Two types of objects are defined: PRIME-OBJECTS and COMPOSITE OBJECTS. A PRIME-OBJECT (PO) is the smallest graphical element out of which larger graphical structures may be composed. In a freehand drawing editor, POs are associated with simple unbroken and non-crossing curve segments that describe the appearance of chains of "black" or "on" pixels in the image. A PO is not immutable however (such as a pixel is); a PO may in general be destroyed by being broken into a set of smaller POs that cover the same image space, or by merging with other POs. A COMPOSITE OBJECT (CO) is associated with a set of PRIME-OBJECTs and thereby refers to individual or combinations of elementary graphical entities (e.g. curves in a freehand drawing editor). Under this interpretation, PRIME-OBJECTs are directly associated with the rendered appearance of pixels in the image; COMPOSITE-OBJECTs refer to the physical appearance of the image only through the POs upon which they are constructed. The set of COs associated with an image constitutes the set of abstract objects by which the user gains access to perceptually coherent collections of image marks. Both types of object are attributed with the properties of spatial location, rough orientation, size, plus miscellaneous other properties. The relationships among POs and COs are maintained by pointers; each CO maintains a list of supporting POs to which it refers, each PO maintains a list of COs which it supports. FIG. 6a–d depicts the Object Lattice for a simple image. FIG. 6a shows a displayed image or object. FIG. 6b shows a break down of the FIG. 6a object into PRIME OBJECTS. FIG. 6c shows how the PRIME OBJECTS is further defined as a series of Composite Objects. FIG. 6d shows the relationship between PRIME OBJECTS and COMPOSITE OBJECTS. Note that the mapping between POS and COs is in general many-to-many. This property achieves the flexibility of multiple perceptual interpretations of a given pattern of "on" image pixels. In addition, each PRIME-OBJECT maintains bi-directional pointers STROKE-END (SE) with a pair of objects, which describe explicitly the locations and orientations of each end of the curve described by the PO.

Figure 9:
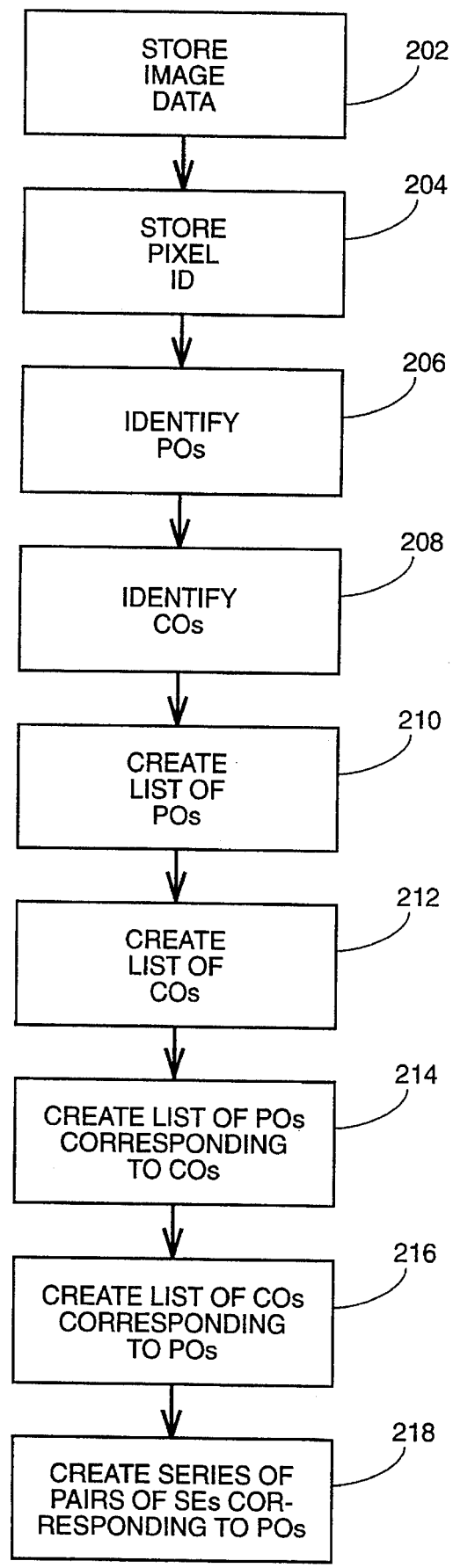
FIG. 9 shows the routine for the Object Lattice operation.

The sequence of operations shown in FIG. 9 defining the routines employed in the Object Lattice is as follows:

1. Store Image data, 202
2. Store Pixel identification from the image data, 204
3. Identify POs, 206
4. Identify COs, 208
5. Create a list of POs 210
6. Create a list of COs 212
7. Create a list of POs corresponding to COs, 214
8. Create a list of COs corresponding to POs, 216 and
9. Create a series of pairs of SEs corresponding to POs, 218.

2.2 Indexed Graphical Data Structure

PRIME-OBJECTs, COMPOSITE-OBJECTs, and STROKE-ENDs are graphic entities which have characteristic locations, orientations, and sizes in the image. For example, the location of a PO is conveniently defined as the centroid of the plane curve it is associated with. Many important operations of this invention rely on fast access to subsets of objects that lie in a given neighborhood of the image, and/or have a size within a given range. For this reason with reference to FIG. 10, a spatial/scale indexed graphical data structure 102 organizes objects, or tokens, according to their locations and sizes routine 220. The data structure 102 resembles a stack of two-dimensional arrays holding successively larger size objects. Each elemental one of these arrays maintains a list of objects lying within a restricted spatial neighborhood whose size depends upon the size-range, or scale, of that slice of the data structure 102. Objects are indexed according to spatial location and size by accessing the appropriate array bin(s). A typical operation taking advantage of the data structure 102 is, "Return all tokens within distance d of either end of PO-N." The data structure 102, termed a Scale-Space Blackboard is described in the open literature, for example,in "Symbolic Construction of 2D Scale-space Images", Eric Saund, IEEE Transactions on PAMI, vol 12, no. 8, 1990, pp 817–830.

Figure 10:
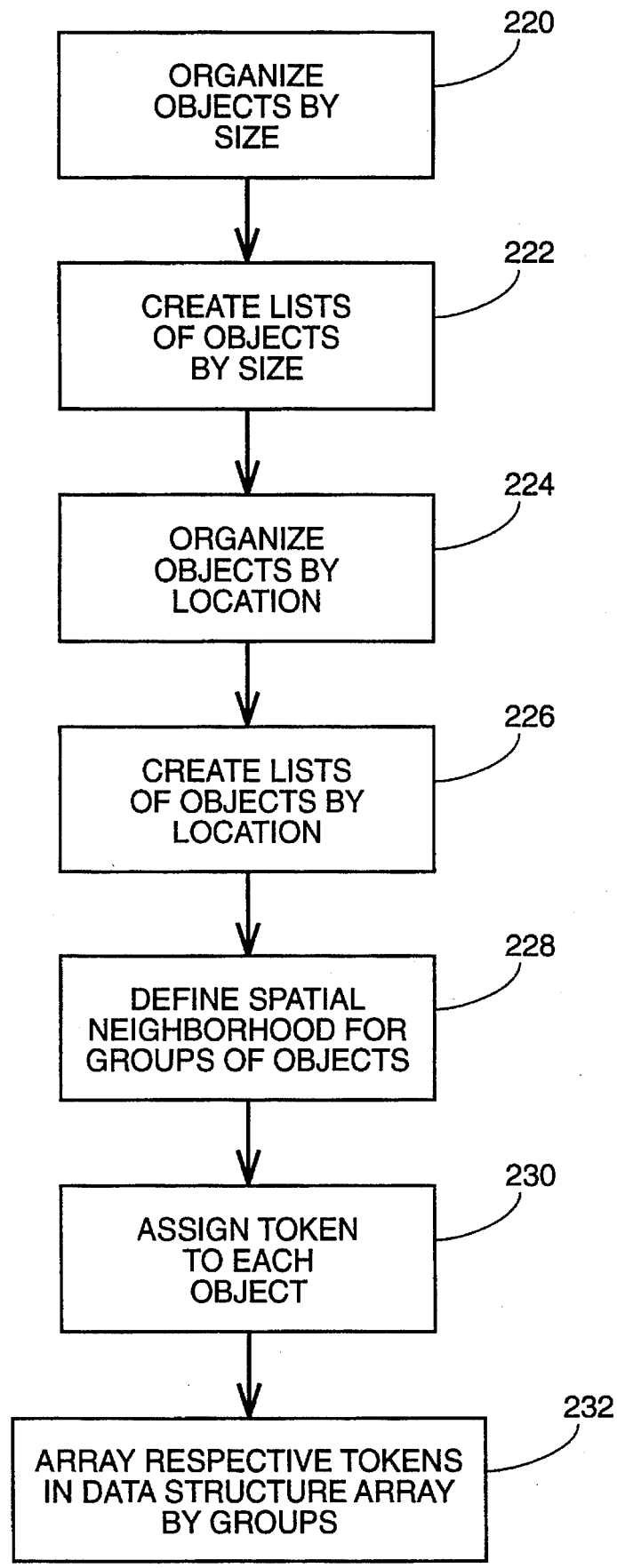
FIG. 10 shows the routine for the Graphical Data Structure operation.

The steps to put objects in the scale-space blackboard shown in FIG. 10, are as follows.

1. Organize objects by size, 220
2. Create lists of objects by size, 222
3. Organize objects by location, 224

4. Create lists of objects by location, 226

5. Define spatial neighborhood for groups of objects, 228

6. Assign a token to each object, 230 and

7. Array respective tokens in data structure array by groups, 232

2.3 Utility Bitmap

Among the criteria identified in this invention for partitioning a freehand line drawing into manipulable units is that significant perceptual events occur at intersections of curves. Consequently, it is necessary to identify crossings and junctions of curve segments, as described by POs, quickly and efficiently. To facilitate this function, a Utility Bitmap data structure 104 contains the midline path of all curves present in the image. When a new curve is introduced, either by the user making a stroke in DRAW mode, or else by the user moving an existing stroke in COMMAND mode, the path of the newly placed curve is traced in the Utility Bitmap, and any intersection with an existing curve is detected by the presence of an already-on pixel. The identity of the PO associated with the already-present curve is readily established by collecting from the Scale-Space Blackboard 102 all POs in the neighborhood of the intersection pixel, and testing each in turn.

Figure 11:
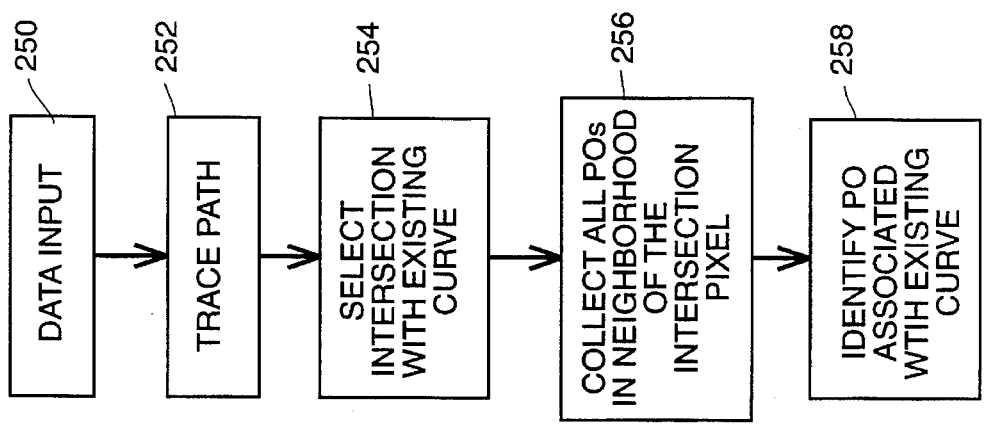
FIG. 11 shows the routine for the Utility Bitmap operation.

The sequence of operations, i.e. the rules, defining the routines employed in the Utility Bitmap is as follows as shown in FIG. 11.

1. Data input, 250

2. Trace path, 252

3. Select intersection with existing curve, 254

4. Collect all POs in neighborhood of the intersection pixel, 256 and

5. Identify PO associated with existing curve, 258

2.4 Spatial Analysis Operations

Figure 7A:
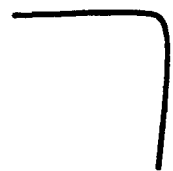
FIGS. 7a–e illustrates stroke analysis.
Figure 7B:
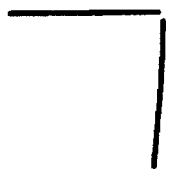
Figure 7C:
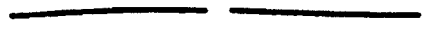
Figure 7D:
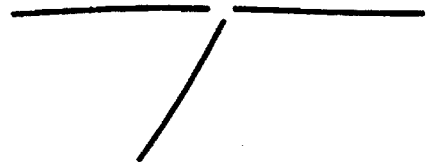
Figure 7E:
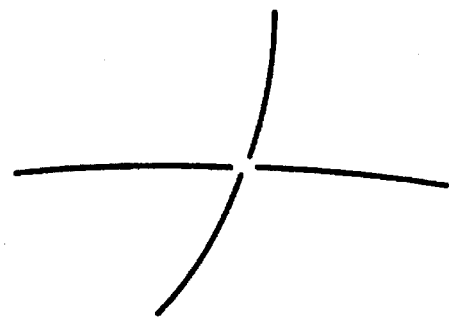

Because the objective of this invention is to provide users with explicit access to "chunks" of the image reflecting their low-level internal visual percepts, a spatial image analysis component 106 is necessary for assessing and interpreting spatial relationships among the graphic objects maintained in the above-mentioned data structures. For example, when two PRIME-OBJECTs are brought into such proximity that two of their associated STROKE-ENDs are very near to one another and are oriented at approximately a 90° angle with respect to one another, then the visual appearance is created that these curves meet at a corner. See FIG. 7b. This geometrical property must be detected and recorded by the program so that appropriate abstract graphic objects (COs) can be made available to the user encompassing both of the POs that participate in forming this corner. This invention makes use of the following spatial analysis operations as illustrated in FIG. 7a–e:

detect corner on a single curve drawn by the user. FIG. 7a detect corner configuration between two POs. FIG. 7b detect isolated join configuration between two POS. FIG. 7c detect alignment of POs across a T-junction. FIG. 7d detect alignment of POs across a crossing junction. FIG. 7e

Program routines for performing these functions are straight forward and will be apparent to those skilled in the art. The terminology, to "resolve" a junction, refers to the application of these spatial analysis operations to a set of POs whose mutual spatial relationships are suspected to have been changed by a user action.

Figure 12:
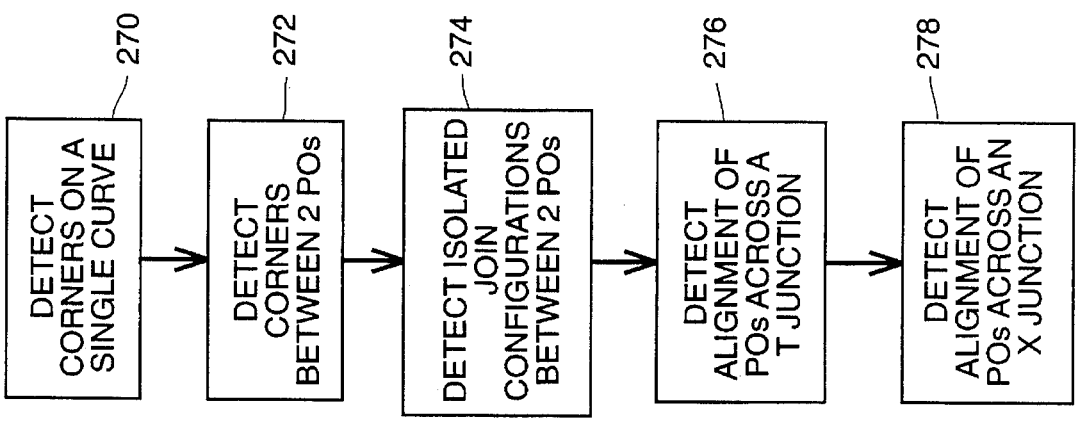
FIG. 12 shows the routine for Spatial Analysis operation.

The sequence of operations defining the routines employed in the Spatial Analysis is as follows as shown in FIG. 12

1. Detect corners on a single curve, 270

2. Detect corners between 2 POs, 272

3. Detect isolated join configurations between 2 POs, 274

4. Detect alignment of POs across a T junction, 276 and

5. Detect alignment of POs across an X junctions, 278

2.5 Grouping Operations

Figure 8A:
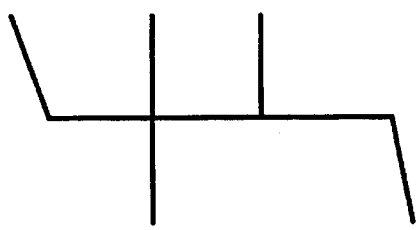
FIGS. 8a–f show sub object selection.
Figure 8B:
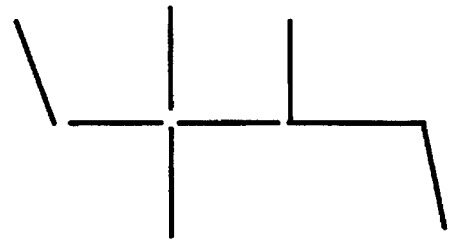

The user accesses and modifies graphic objects at the level of COMPOSITE-OBJECTs, each of which maintains pointers to its constituent Prime-OBJECTs in routine 108. When an image is modified by drawing, erasing, or moving lines, the description of the locations of "on" pixels changes at the level of POs. These changes must propagate upward to the CO level so that the user-accessible objects always reflect valid and perceptually salient collections of curve segments. The responsibility for maintaining an accurate and consistent relationship among POs and the COs they support falls to a set of token grouping operations. These operations implement rules for what COs should be constructed in the Object Lattice 100 for given collections of POs. Under the design architecture of this invention, the rule set is extensible, and specialized rules may be accumulated so as to make available particular sorts of structure characteristic of particular drawing application domains. Specifically, the following basic rules are appropriate to freehand and structured curve editing applications. See FIG. 8a–f. The basic object, FIG. 8a, is decomposed as follows:

1. One CO is uniquely associated with every PO. FIG. 8b

Figure 8C:
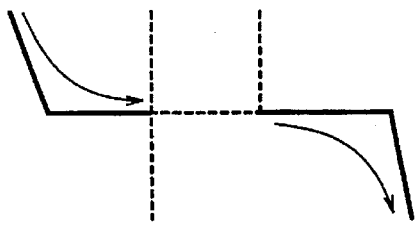

2. A CO is asserted for every path joining POs through corners but stopping at isolated ends and junctions. FIG. 8c

Figure 8D:
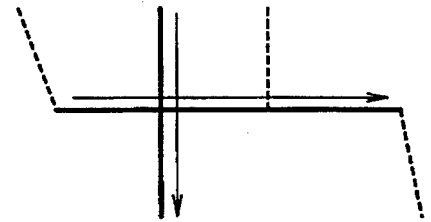

3. A CO is asserted for every path joining POs that align across junctions, but stopping at corners. FIG. 8d

Figure 8E:
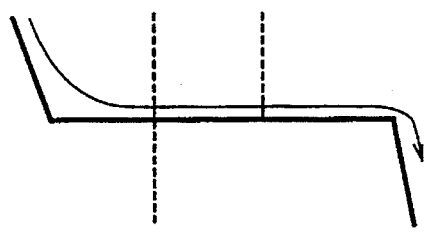

4. A CO is asserted for every path joining POs that align across junctions or are joined at corners. FIG. 8e

Figure 8F:
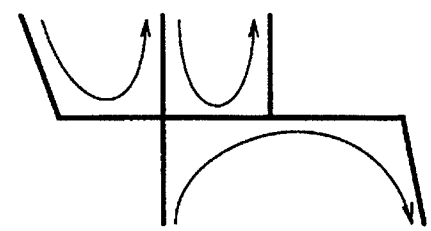

5. One CO is asserted for every set of POs joining along a convex path. FIG. 8f

These rules are implemented primarily by tracing paths through sets of POs, where the corner and alignment links between POs are maintained in their associated STROKE-END tokens. Care is taken in the implementation of these rules that paths or sets of POs satisfying more than one rule become associated with one and only one CO.

Figure 13:
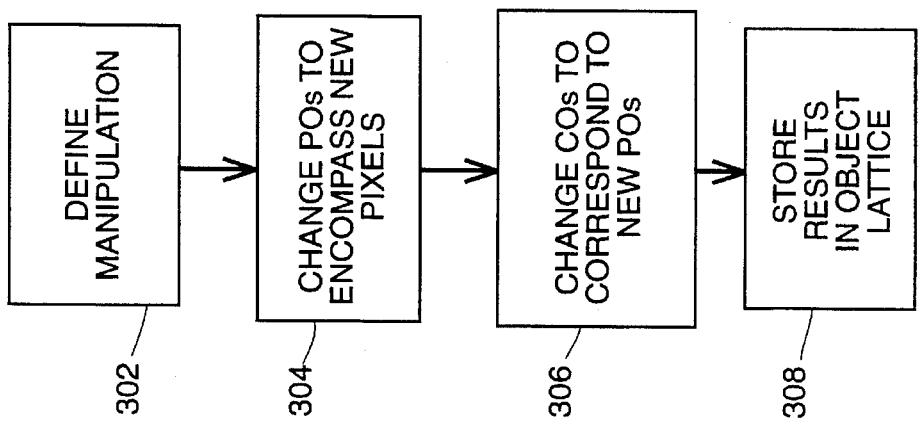
FIG. 13 shows the routine for the Grouping Operations.

The sequence of operations shown in FIG. 13 and defining the routines employed in the Grouping Operations is as follows.

1. Define manipulation, 302

2. Change POs to encompass new pixels, 304

3. Change COs to correspond to new POs, 306 and

4. Store results in object lattice, 308

2.6 Basic Control-Level Operation: Add Object(s) to Image

Figure 14:
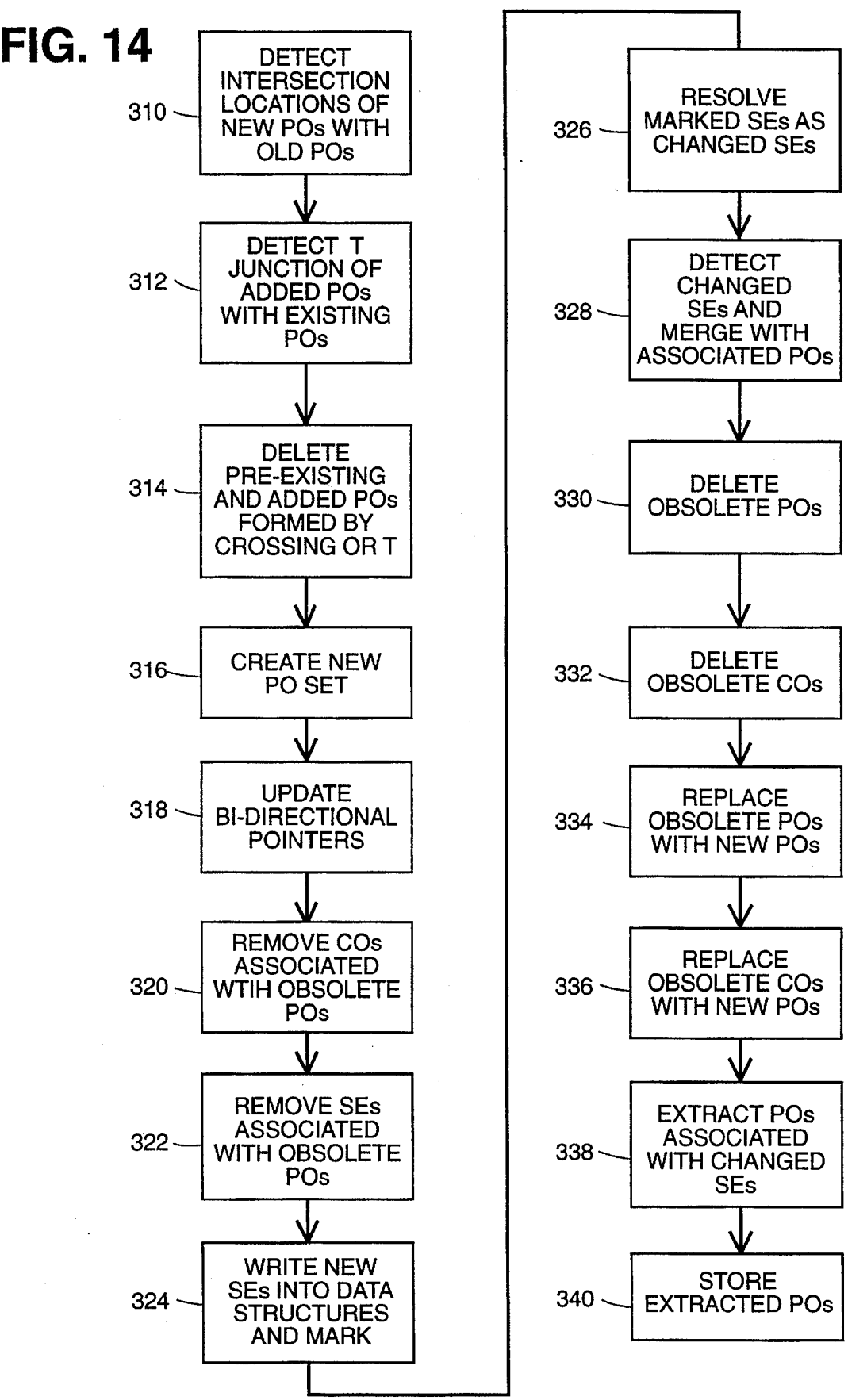
FIG. 14 shows the routine for the Add Object to Image operation.

The routine for adding one or more curve segments to an image are outlined in FIG. 14. Each curve segment is assumed to be described as a PRIME-OBJECT, including associated STROKE-END tokens.

1. Detect locations where the added POs form new crossing junctions with pre-existing POs, routine 310. This is done using the Utility Bitmap data structure 104 as described in Section 2.3. Crossing locations associated with each PO are recorded as breakpoints for that PO.

2. Detect locations where added POs form T-junctions with pre-existing POs, routine 312. It is desired that T-junctions be detected with some distance tolerance, that is, where the curve segments do not actually touch. Conversely, T-junctions formed with pre-existing POs forming the "horizontal bar" of the T are detected using the Utility Bitmap (into which has been already colored the paths of the pre-existing POs) and tracing a path beyond each end of each added PO for some tolerance distance. T-junctions formed with added POS forming the horizontal bar of the T are detected using a scratch Utility Bitmap into which are colored all added POs. Then, pre-existing POs that are near to any of the added POs are found using the Scale-Space Blackboard 102. Each of these is traced onto the scratch Utility Bitmap beyond its endpoints, looking for pixels already colored by one of the added POs. If any such T-crossing is detected, the identity of the added PO forming the horizontal bar of the T is found by writing all added POs into a scratch Scale-Space Blackboard, collecting added POs in the neighborhood of the crossing, and testing these in turn to see which PO's chain code curve passes through that point. Breakpoints are asserted for T-junctions as they are for crossing junctions found in Step 1.

3. Each pre-existing and added POs that has at least one breakpoint formed by a crossing or T-junction now becomes obsolete, routine 314; each is subdivided into a new set of POs, routine 316 according to the breakpoints. The bi-directional pointers of the Object Lattice data structure 100 are updated, routine 318 so that COs previously supported by the now-obsolete PO now become supported by the set of new POs into which the obsolete PO was subdivided. However, the CO uniquely associated with each obsolete PO becomes itself obsolete, and is removed, routine 320 from the Object Lattice 100. All SEs associated with obsolete POs are removed routine 322 from the Scale-Space Blackboard 102, and all newly created SEs written onto it routine 324. Every SE associated with POs created or otherwise affected by this procedure are marked as "affected SEs" routine 326.

4. The set of affected SEs is passed to 104 the "resolve junctions" procedure, routine 326, and the spatial relationships among affected SEs and their associated POs is analyzed as discussed in Section 2.4. Each SE is labeled according to which, if any, SEs in its vicinity form an isolated join, alignment junction or a corner junction with it. All newly established SEs, plus the set of SEs whose spatial relationship status is found by the resolve procedure to have been affected by the image modification are marked as "changed SEs."

5. All pairs of changed SEs forming an isolated join type junction are detected and their respective POs are merged together, routine 328. These now-obsolete POs are removed from the Object Lattice data structure, routine 330, as are the COs that previously were uniquely associated with them, routine 332. These are replaced by single new POs routine 334 plus uniquely associated single new COs, routine 336.

6. The POs associated with changed SEs are extracted, routine 338 and these are stored and used as seeds, routine 340, for updating the paths through spatially related POs giving rise to user-accessible COs according to the rules described in Section 2.5.

The sequence of operations of FIG. 14 defining the routines employed in the Add Object to Image is as follows.

1. Detect intersection locations of new POs with Old POs, 310

2. Detect T functions of J added POs with existing POs, 312

3. Delete pre-existing and added POs formed by crossing or T, 314

4. Create new PO set, 316

5. Update bi-directional pointers, 318

6. Remove COs associated with obsolete POs, 320

7. Remove SEs associated with obsolete POs, 322

8. Write new SEs into data structures and mark, 324

9. Resolve marked SEs as changed SEs, 326

10. Detect changed SEs and merge with associated POs, 328

11. Delete obsolete POs, 330

12. Delete obsolete COs, 332

13. Replace obsolete POs with new POs, 334

14. Replace obsolete COs with new POs, 336

15. Extract POs associated with changed SEs, 338

16. Store extracted POs, 340

2.7 Basic Control-Level Operation: Remove Object(s) from Image

Figure 15:
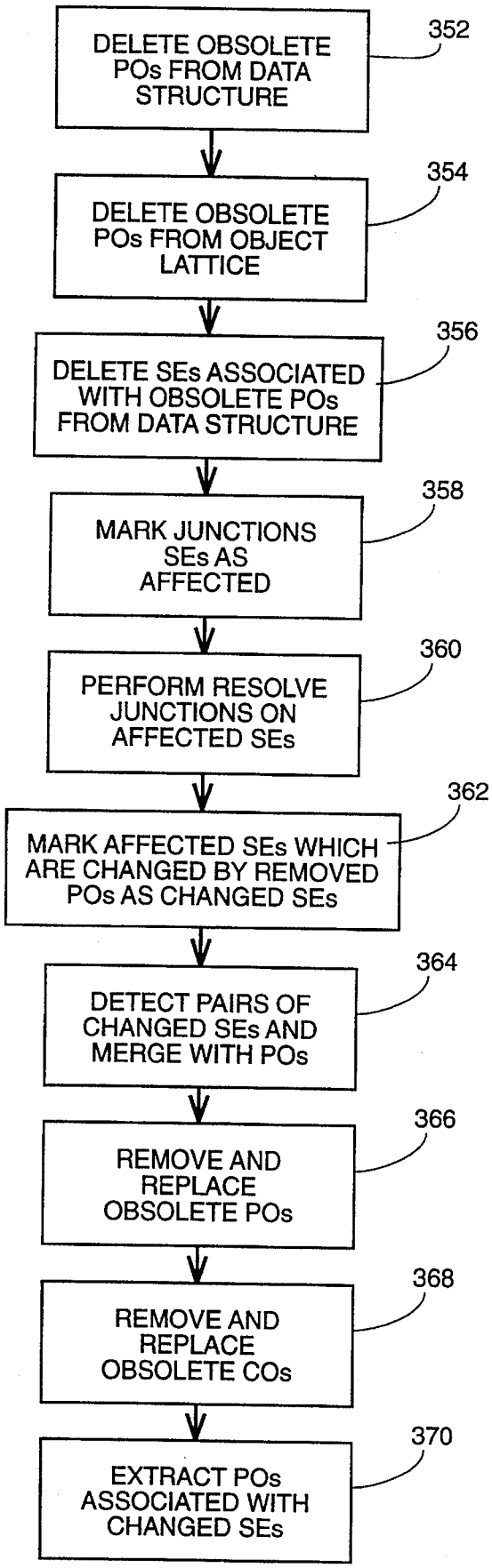
FIG. 15 shows the routine for the Remove Object from Image operation.

The routine for removing one or more curve segments from an image is outlined in FIG. 15. Each curve segment is assumed to be described as a PRIME-OBJECT, including associated STROKE-END tokens. The human user interacts with the image at the level of COMPOSITE-OBJECTS, but the POs associated with the COs to be removed are readily deducible using the parent/child relationships in the Object Lattice data structure.

1. Delete every to-be-removed PO from the Scale-Space data structure and from the Object Lattice data structure, routine 352.

2. Delete every CO whose support includes any of the to-be-removed POs from the Object Lattice, routine 354.

3. Delete the SEs routine 356 associated with every to-be-removed PO from the Scale-Space data structure. Note whether any of these to-be-removed SEs forms an alignment or corner junction with any SE that is not to be removed, or, whether any not-to-be-removed SE falls within a threshold distance from any to-be-removed SE. These are marked as "affected SEs" routine 358.

4. Perform routine 360, the "resolve junctions" operation on all affected SEs. Note which affected SE is assigned a different alignment or corner spatial relationship with other SEs as a result of the removal of the to-be-removed POs. These are marked as "changed SES", routine 362.

5. All pairs of changed SEs forming an isolated join type junction are detected and their respective POs are merged together, routine 364. The now-obsolete POs are removed from the Object Lattice data structure, routine 366 as are the COs that previously were uniquely associated with them, routine 368. These are replaced, routine 368 by single new POs plus uniquely associated single new COs.

6. The POs associated with changed SEs are extracted, routine 370, and these are used as seeds for updating the paths through spatially related POs giving rise to user-accessible COs according to the rules described in Section 2.5.

The sequence of operations in FIG. 15 defining the routines employed in the Remove Object From Image is as follows.

1. Delete obsolete POs from data structure, 352
2. Delete obsolete POs from object lattice, 354
3. Delete SEs associated with obsolete POs from data structure, 356
4. Mark junction SEs as affected, 358
5. Perform resolve junctions on affected SEs, 360
6. Mark affected SEs which are changed by removed POs as changed SEs, 362
7. Detect pairs of changed SEs and merge with POs, 364
8. Remove and replace obsolete POs, 366
9. Remove and replace obsolete COs, 368
10. Extract POs associated with changed SEs, 370.

In accordance with the invention, some objects play multiple roles (i.e. when they have multiple parents in the lattice). After some operations, such as a move, the objects can be duplicated in order to preserve these multiple roles.

Figure 16A:
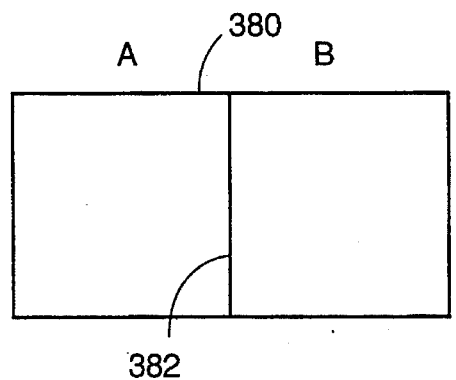
FIG. 16a–c show a multiple role for share boundary objects.
Figure 16B:
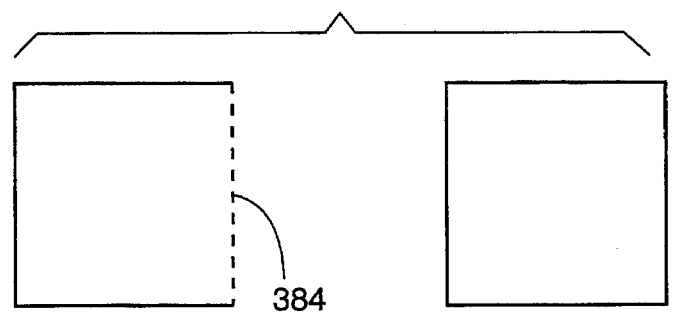
Figure 16C:
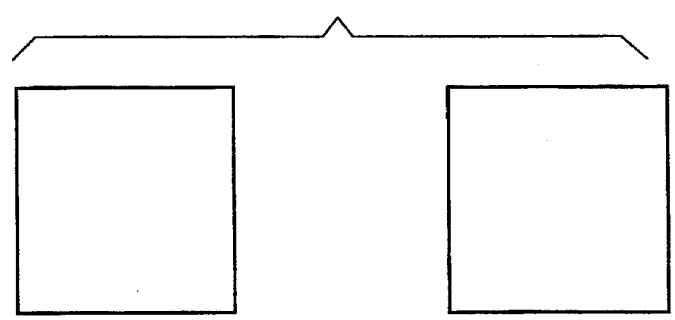

A multiple role example is shown in FIG. 16*a–c*. Here, an object 380 such as a rectangle is shown with a dividing center line 382 which is intended to form a shared boundary between positions A and B of the rectangle. The intent may be user defined or context defined. In a move operation, FIG. 16*b*, portion A is detached from portion B. The line 382 is maintained on the fixed portion B, while the portion A is shown in dotted boundary 384 during the move. After completion of the move, the boundary 384, which is a duplicate of 382, is made a permanent part of the object. The grouping rules defining the multiple role concept provides the data base for the new boundary, as described above with other operations.

Some elements are needed only for purposes of efficiency. Thus, the blackboard and bitmap data structures described with reference to FIG. 3*b* are not essential to the broad aspects of the invention. An image analyzer can use any data structure that allows spatial relations to be computed.

Certain changes and modifications of the embodiments of the invention herein disclosed will be readily apparent to those of average skill in the art. Moreover, uses of the invention other than for coordinate determination in a digitizer system will also be readily apparent to those of skill in the art. It is the applicants' intention to cover by the claims all such uses and all those changes and modifications which could be made to the embodiments of the invention herein chosen for the purposes of disclosure which do not depart from the spirit and scope of the invention.

What is claimed is:

1. A graphical input and display system for creating and manipulating an abstract graphical image comprising:

input means, display means, memory means and function selection means, said input means being user manipulable for entering said graphical image onto said display means and for selecting functions on said function selection means for manipulating said graphical image;

means for decomposing said graphical image entered onto said display means into abstract elemental objects;

means for organizing said elemental objects into abstract groups of elemental objects, such that each elemental object belongs to one or more groups and each group contains one or more elemental objects;

means for reorganizing all or part of said groups of elemental objects into one or more new abstract groups of elemental objects in response to a user manipulation of all or part of said graphical image; and at least one data structure stored in said memory means in which said elemental objects and said groups of elemental objects are linked.

2. The graphical input and display system of claim 1 further comprising a spatial and scale indexed graphical data structure stored in said memory means for organizing said groups of elemental objects according to the locations and sizes of said groups in said graphical image.

3. The system of claim 1 wherein said at least one data structure comprises a lattice data structure in which each elemental object is linked to each group to which it belongs and each group is linked to each elemental object contained in said group.

4. The system of claim 3 wherein said lattice data structure comprises a series of bi-directional pointers linking each of said elemental objects with each corresponding group of elemental objects.

5. The system of claim 1 further comprising means for updating said at least one data structure in response to a reorganization by said means for reorganizing.

6. The system of claim 1 further comprising means for manipulating each of the elemental objects belonging to a group in response to a user manipulation of said group.

7. The system of claim 1 wherein said means for decomposing a graphical image into abstract elemental objects comprises:

a bit map data structure stored in said memory means for accessing values of pixels in the graphical image; and means for organizing said pixels into said elemental objects based at least in part on said values of said pixels.

8. The system of claim 1 wherein said means for organizing said elemental objects into groups comprises a spatial image analyzer for heuristically determining spatial and geometric properties of said elemental objects.

9. A method of manipulating all or a portion of a graphical abstract image entered on a display device comprising:

decomposing said graphical image into abstract elemental objects;

organizing said elemental objects into abstract groups of objects;

storing a data structure linking said elemental objects and said groups of elemental objects;

determining based on said data structure which of said elemental objects are to be manipulated in accordance with a selected manipulation of a given group of elemental objects in said graphical image;

performing said selected manipulation on said determined elemental objects;

reorganizing said manipulated elemental objects into further abstract groups of elemental objects;

updating said data structure in accordance with said reorganization.

10. The method of claim 9 wherein said graphical image includes at least a first and second portion having a shared boundary, said method further comprising the steps of: assigning a multiple role to said shared boundary and, following a manipulation of said first or second portion, reorganizing said first and second portions into separate groups of elemental objects, such that at least one of said groups has a boundary duplicating said shared boundary.

11. A method of processing data representing a graphical image comprising:

deriving pixel identification data from the graphical image data;

identifying Prime Objects from the pixel identification data;

identifying a plurality of perceptually coherent Composite Objects from the Prime Objects, each Composite Object being a set of one or more Prime Objects;

creating a list of Prime Objects and a list of Composite Objects; and linking the lists such that each Prime Object and each Composite Object to which the Prime Object corresponds is linked and each Composite Object and each Prime Object to which the Composite Object corresponds is linked, thereby providing the ability to locate a Prime or Composite Object based on the identity of the corresponding Composite or Prime Object, respectively.

12. The method of claim 11 further comprising the steps of deriving Stroke Ends from the Prime Objects and creating a list of series of pairs of Stroke Ends corresponding to the Prime Objects from which said Stroke Ends are derived.

13. The method of claim 12, wherein new objects are added to the graphical image, comprising the steps of: detecting intersection locations of added Prime Objects with existing Prime Objects, detecting T junctions of added Prime Objects with existing Prime Objects, deleting existing and added Prime Objects formed by crossing or T junction, creating new Prime Object set, deleting obsolete Prime Objects and replacing with new Prime Objects, updating Stroke Ends associated with each Composite Object, removing Composite Objects associated with obsolete Prime Objects, removing Stroke Ends associated with obsolete Prime Objects, writing new Stroke Ends into data structures and marking such Stroke Ends, resolving marked Stroke Ends as changed Stroke Ends, detecting changed Stroke Ends and merging same with associated Prime Objects, deleting obsolete Composite Objects and replacing with new Composite Objects, extracting Prime Objects associated with changed Stroke Ends, and storing said extracted Prime Objects.

14. The method of claim 12, wherein objects are deleted from the graphical image, comprising the steps of: deleting obsolete Prime Objects and replacing with new Prime Objects, deleting Stroke Ends associated with obsolete Prime Objects, marking junction Stroke Ends as affected, performing resolve junctions on affected Stroke Ends, marking affected Stroke Ends which are changed by removed Prime Objects as changed Stroke Ends, detecting pairs of changed Stroke Ends and merging with Prime Objects, removing and replacing obsolete Composite Objects, and extracting Prime Objects associated with changed Stroke Ends.

15. The method of claim 11 wherein Prime or Composite Objects are grouped and indexed according to their size and location within the graphical image, comprising the steps of: sorting Objects by size, creating lists of Objects sorted by size, sorting Objects by location, creating lists of Objects sorted by location, defining a spatial neighborhood for each group of Objects, the size of the neighborhood depending upon a predetermined range of scale space for the Objects in the group, assigning a token to each Object in the neighborhood, and arraying respective tokens in an indexed data structure array by groups within the predetermined range of scaled space.

16. The method of claim 11 wherein the data is further processed following a manipulation of the graphical image by a user, comprising:

defining a region of the graphical image affected by the manipulation;

deriving revised pixel identification data in the affected region;

identifying Composite Objects and corresponding Prime Objects in the affected region;

changing the Prime Objects in the affected region based on the revised pixel identification data;

changing the Composite Objects in the affected region based on the changed Prime Objects; and updating the lists of Prime and Composite Objects and the links therebetween based on the changed Prime and Composite Objects.

17. An article of manufacture comprising a computer usable medium having computer readable program code embodied in said medium which, when said program code is executed by said computer, causes said computer to perform method steps for creating and manipulating an abstract graphical image entered onto a display, said method steps comprising:

decomposing the graphical image into abstract elemental objects;

organizing said elemental objects into abstract groups of elemental objects, such that each elemental object belongs to one or more groups and each group contains one or more elemental objects;

creating at least one data structure in which said elemental objects are linked with said groups of elemental objects;

reorganizing all or part of said groups of elemental objects into one or more new abstract groups of elemental objects in response to a user manipulation of all or part of said graphical image; and updating said at least one data structure in response to a reorganization.

18. A memory for storing data for access by a program being executed on a computer for creating and manipulating data representing an abstract graphical image, said memory comprising:

a lattice data structure stored in said memory, said lattice data structure including data used by said program, including:

a plurality of elemental objects stored in said memory, said elemental objects being derived from pixel identification data derived from the graphical image data, the elemental objects arranged in at least one elemental object list;

a plurality of perceptually coherent composite objects identified from the elemental objects, each composite object being a set of one or more elemental objects, said composite objects arranged in at least one composite object list; and a plurality of bi-directional pointers linking the elemental object list or lists and the composite object list or lists such that each elemental object and each composite object to which the elemental object corresponds are linked and each composite object and each elemental object to which the composite object corresponds is linked, said lattice data structure providing the program with the ability to locate and manipulate an elemental or composite object based on the identity of a corresponding composite or elemental object.

* * * * *